J. W. PAUL & C. HALL.
BREATHING APPARATUS FOR USE IN NOXIOUS GASES.
APPLICATION FILED JULY 10, 1916.

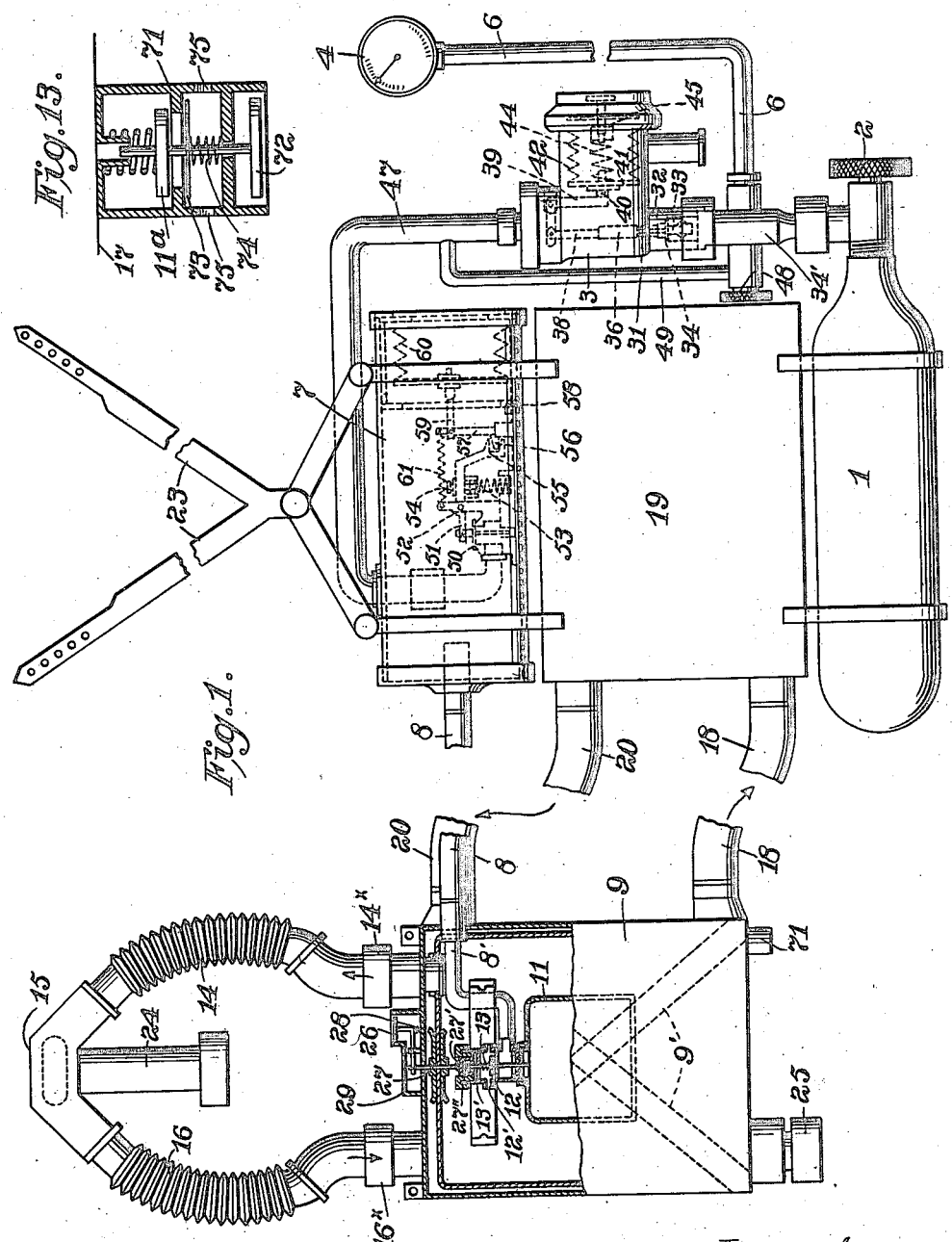

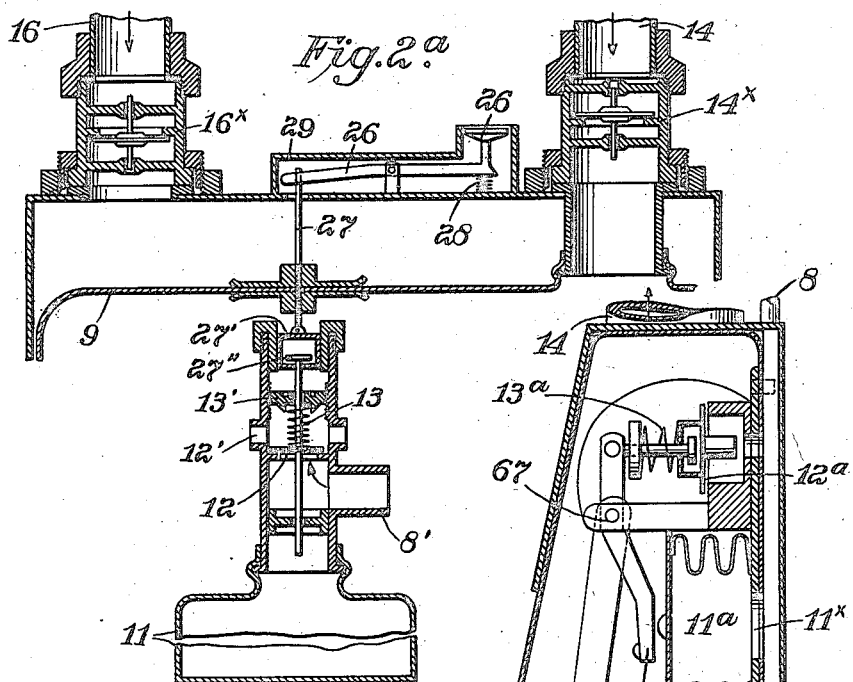
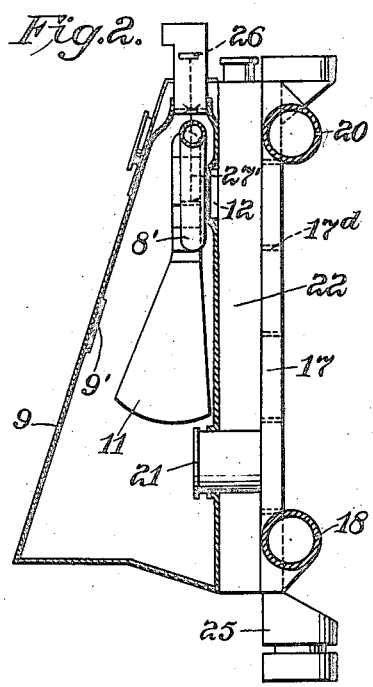
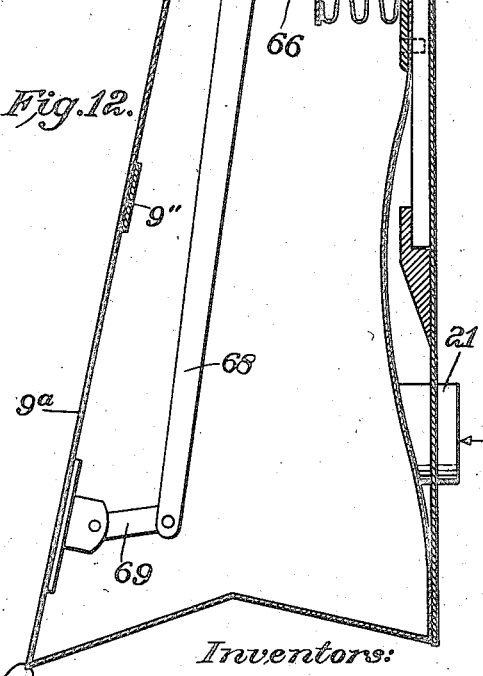

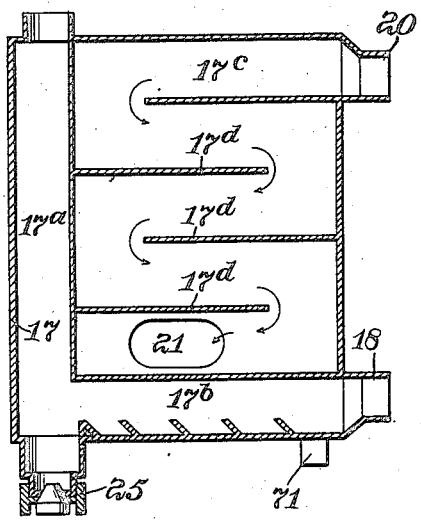
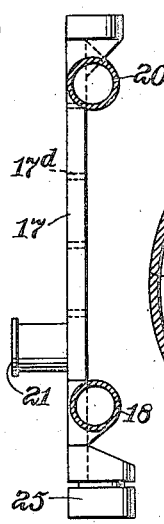
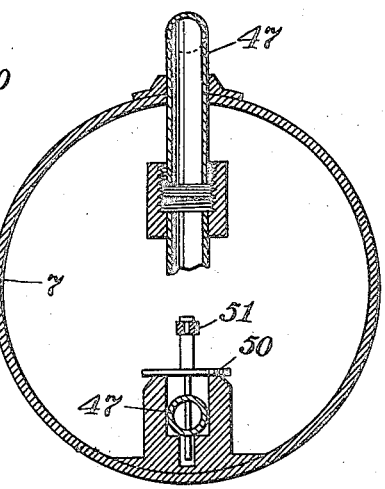
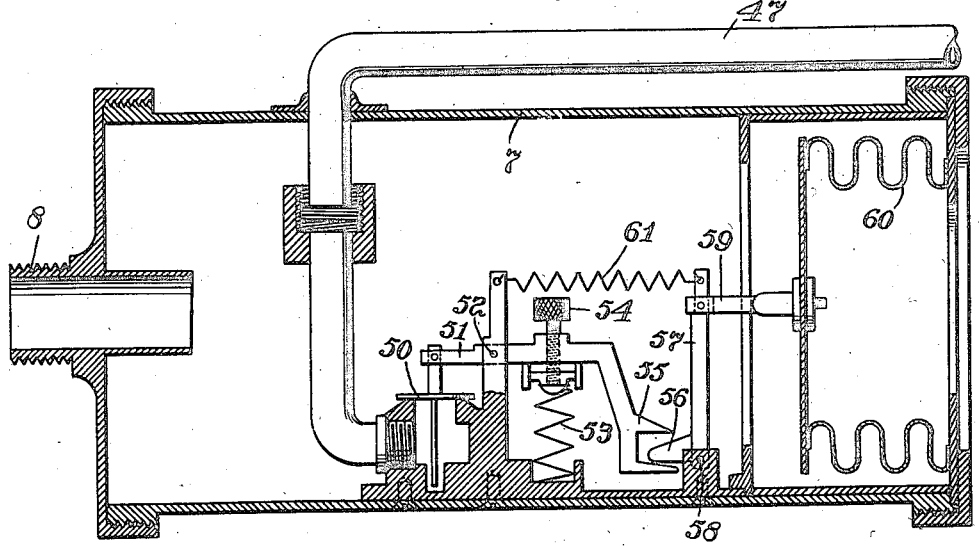

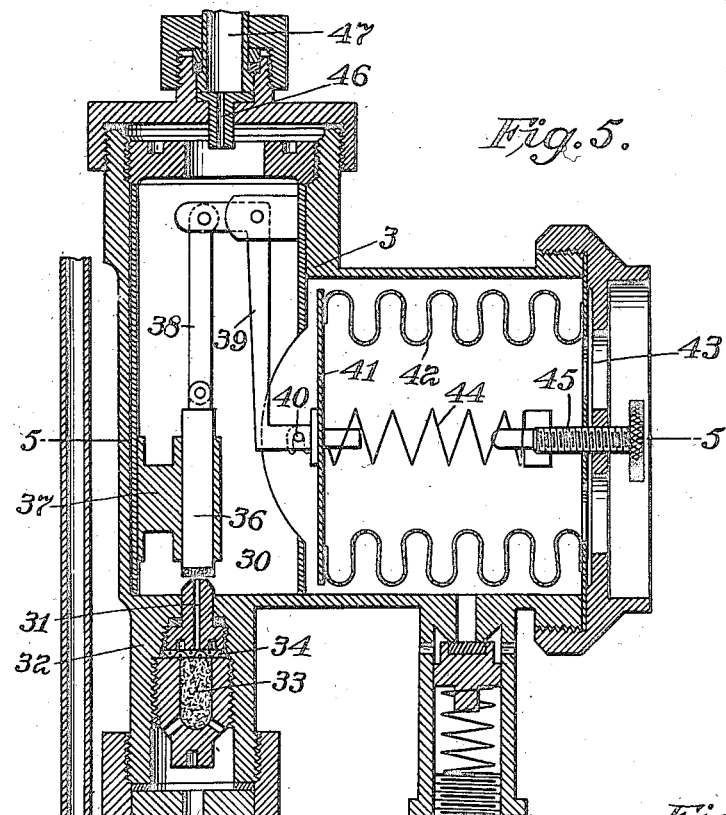
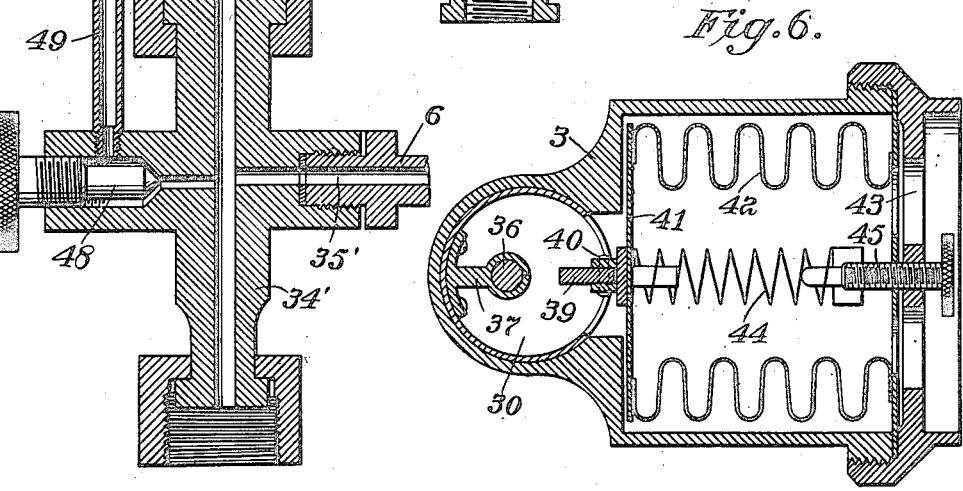

1,225,269.

Patented May 8, 1917.
6 SHEETS—SHEET 5.

Inventors:
James W. Paul,
Clarence Hall,
by Spear, Middleton, Donaldson & Spear,
Attys.

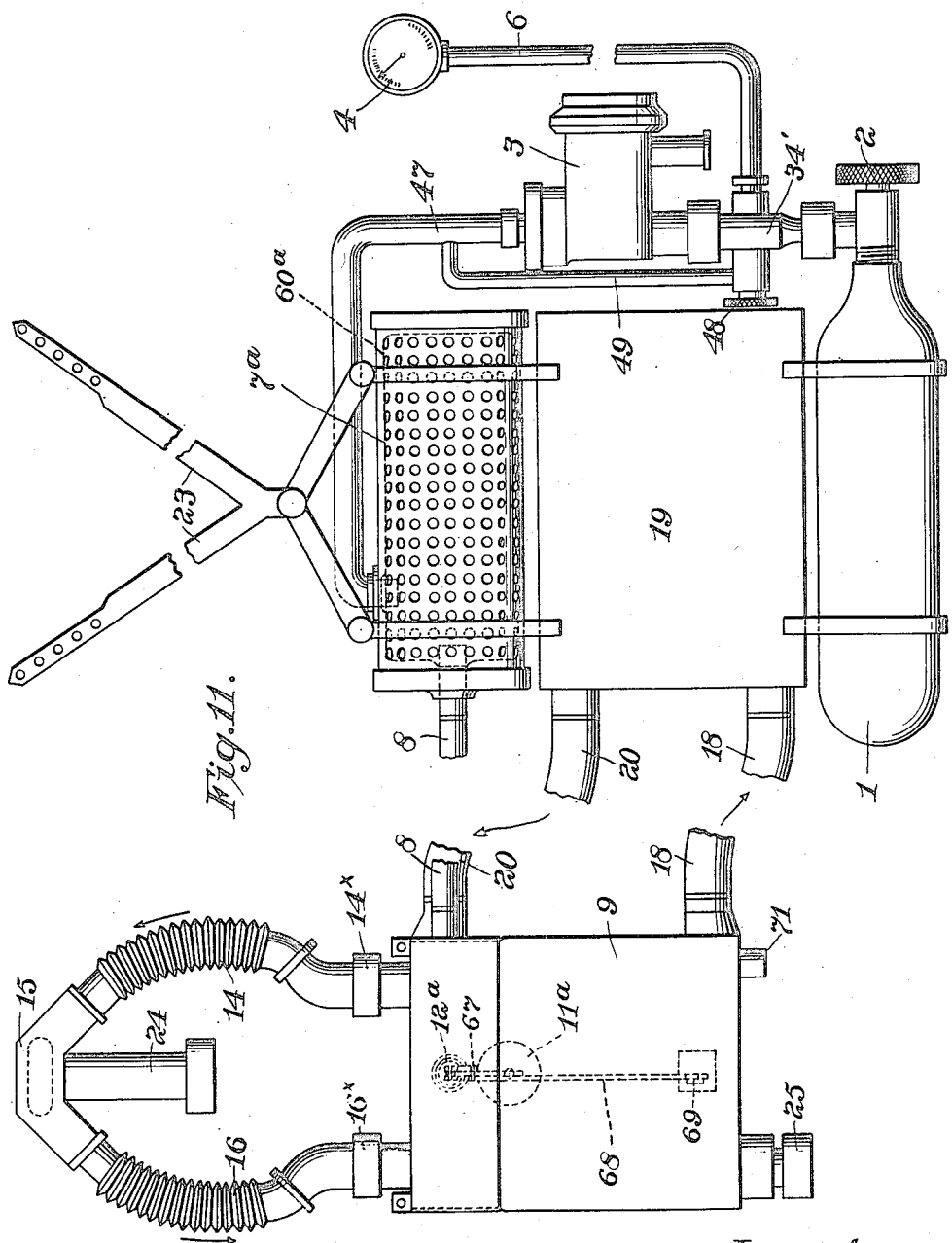

UNITED STATES PATENT OFFICE.

JAMES W. PAUL AND CLARENCE HALL, OF PITTSBURGH, PENNSYLVANIA; SAID PAUL ASSIGNOR TO SAID HALL.

BREATHING APPARATUS FOR USE IN NOXIOUS GASES.

1,225,269.   Specification of Letters Patent.   Patented May 8, 1917.

Application filed July 10, 1916. Serial No. 108,335.

*To all whom it may concern:*

Be it known that we, JAMES W. PAUL and CLARENCE HALL, citizens of the United States, and residents of Pittsburgh, Pennsylvania, have invented certain new and useful Improvements in Breathing Apparatus for Use in Noxious Gases, of which the following is a specification.

The invention relates to apparatus for supplying an artificial atmosphere to a person surrounded by noxious or poisonous gases or fumes, the apparatus being adapted to be worn by the person and enabling him to enter places having an atmosphere which is irrespirable.

The invention consists in the features and combination and arrangement of parts hereinafter described and particularly pointed out in the claims.

In the drawings:—

Figure 1 is a diagrammatic view of the apparatus with parts in section.

Fig. 2 is an end elevation of a part of the apparatus with parts in section.

Fig. 2$^a$ is a detail view of valve mechanism.

Fig. 3 is a sectional view of the manifold through which the expired air passes to the absorber and in which the inspiratory air is cooled.

Fig. 4 is an edge view of Fig. 3.

Fig. 5 is a sectional view of an oxygen pressure regulator or reducing valve mechanism.

Fig. 6 is a sectional view of Fig. 5 on the line 5—5 thereof.

Fig. 7 is a sectional view of an automatic oxygen regulator.

Fig. 8 is a cross sectional view of Fig. 7.

Figure 9:
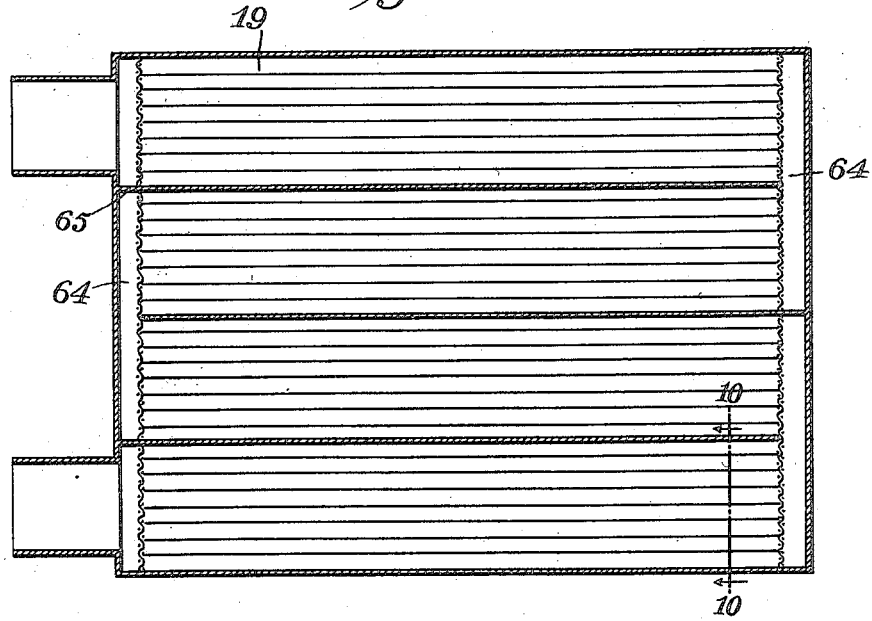

Fig. 9 is a sectional view of the absorber.

Figure 10:
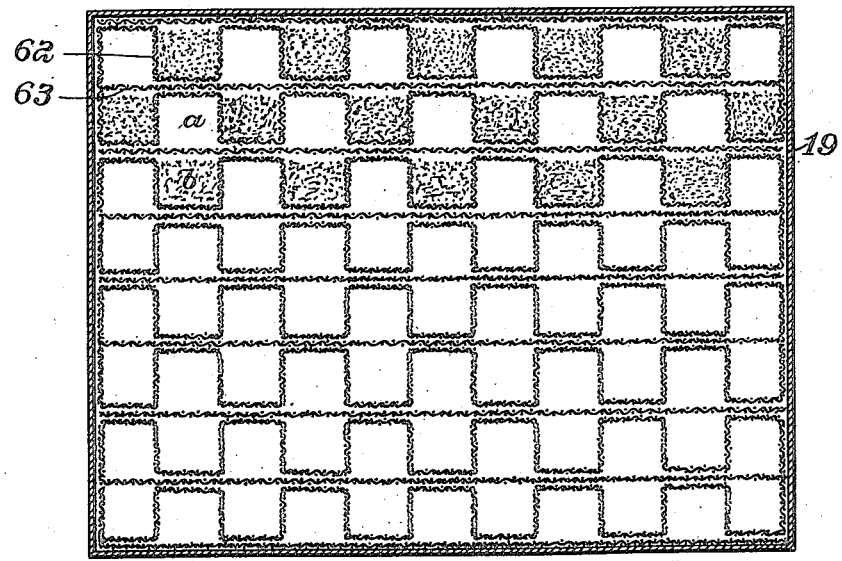

Fig. 10 is a cross sectional view of a portion of the absorber on line 10—10 of Fig. 9.

Fig. 11 is a diagram of a modification.

Fig. 12 is a sectional view of the main bag of Fig. 11.

Fig. 13 is a sectional view of the relief valve.

In these drawings 1 indicates an oxygen containing bottle or cylinder capable of holding oxygen under high pressure, this bottle having a closing member at 2 which admits of the discharge of the oxygen from the bottle or the charging of the bottle. At 3 is indicated diagrammatically in Fig. 1 a pressure reducing valve mechanism which admits of the automatic flow of oxygen therethrough but under reduced pressure, say from 50 or 2,000 pounds pressure to 5 or 50 pounds pressure. With this pressure reducing valve mechanism an indicator or pressure gage 4 is connected through a flexible pipe 6 so that the person wearing the outfit can keep this pressure gage in view to ascertain when the oxygen supply is becoming exhausted.

From the pressure reducing valve mechanism 3 the oxygen passes into a cylinder 7 which contains an automatic oxygen regulator shown in detail in Fig. 7. A substantially constant volume and pressure of oxygen is maintained in this cylinder 7, from which the breathing bag, presently to be referred to, is supplied.

From this constant volume cylinder a pipe 8 leads to a breathing bag 9 and in this breathing bag is located an auxiliary bag 11. The pipe 8 has an extension 8' within the main breathing bag connected with the supplemental or auxiliary breathing bag 11, the connection being made between the top of said bag 11 and a valve 12 which controls the outlets 12' for oxygen from the auxiliary bag into the main breathing bag 9. This valve 12 closes downwardly upon its seat or in a direction toward the supplemental bag 11, it being pressed into closed position by a spring 13, pressure of which is regulated by screw collar 13'. From the main breathing bag 9 an inhalation pipe 14 extends to a mouth piece 15 and from this mouth piece an exhalation pipe 16 extends back to a manifold 17 arranged in rear of a cooler 22.

Suitable valves are arranged at the points 14$^\times$ and 16$^\times$ respectively between the main bag and the inhalation pipe and between the exhalation pipe and the manifold 17, Fig. 3, these valves being of any suitable construction, the valve 14$^\times$ closing toward the main bag and the valve 16$^\times$ closing toward the mouth piece, so that the user can inhale through the pipe 14 from the main bag and can exhale through the pipe 16 to the manifold. The manifold is provided with a downwardly extending channel 17$^a$ communicating with a horizontal channel or compartment 17$^b$, from which connection is made through a flexible pipe 18 with the lower part of an absorbing chamber 19 hereinafter more particularly described, said chamber containing absorbent material for the carbon-dioxid and moisture. From the top of this absorbing chamber a pipe 20 extends back to the upper part of the manifold 17 communicating with the channel or compartment 17$^c$, below which are baffle plates 17$^d$ to cause the air freed from the carbon-dioxid to pass along a circuitous route to the opening 21 which leads from the manifold into the main breathing bag 9.

A cooler is arranged at 22 to have a cooling effect upon the air as it passes through the manifold into the main breathing bag, this cooler consisting of a chamber which may be open at top and bottom for the passage of atmospheric air to exert its cooling influence on the air in the manifold and main bag and preferably this cooler is located between the manifold and the main bag as shown in Fig. 2. This cooler, however, may assume various forms, for instance it may be in the form of a container for water or other material which may be of a physical or chemical nature to produce a cooling effect, so that the air which is breathed by the user will not be uncomfortably warm. The pipes 14 and 16 are flexible. The apparatus is worn with the main breathing bag and manifold and cooler arranged on the chest of the user while the oxygen bottle, absorber and constant volume cylinder are at the back of the user, suitable suspending straps, indicated generally at 23 in Fig. 1, being employed to attach the apparatus to the person of the user.

It will be seen from the above that the breathing circuit includes the absorber from which air is drawn through the pipe 20, manifold passages 17$^c$ and port 21 into the main bag, thence through the pipe 14 to the mouth of the user and the exhalations passing out through the pipe 16, the manifold through passages 17$^a$ and 17$^b$ thereof and pipe 18 back to the absorber, and it will be noticed also that the oxgyen supply is delivered into this circuit from the oxygen bottle through the pressure reducing valve, the constant volume or pressure cylinder 7, the pipe 8, its branch 8' to the auxiliary bag 11 and from this bag through the valve 12 into the main bag, mixing with the air which is delivered into said main bag from the absorber through the manifold.

A saliva trap is provided at 24 adjacent the mouth piece 15 and this trap may be of any suitable construction. A saliva drain valve is provided at 25 at the bottom of the manifold and this also may be of any suitable construction.

Upon inhaling from the main bag 9 this bag is deflated and in this action it compresses the supplemental bag 11, increasing the pressure in this supplemental bag with the result that the valve 12 opens and allows oxygen to escape into the main bag 9 and thence to the lungs of the user through the valve at 14$^x$ and the inhalation pipe 14. Upon exhaling through the pipe 16, the air passes down through the manifold to the absorber and thence through the pipes and passages mentioned above. This air freed from carbon-dioxid reaches the main bag 9 causing the same to be inflated, thereby removing pressure of its walls from the supplemental bag, whereupon this supplemental bag automatically refills with oxygen from the constant volume cylinder 7.

The main bag is suitably reinforced at its front side by strips of material indicated at 9' in dotted lines in Fig. 1 to insure proper action of the main bag on the supplemental bag in compressing the latter. The purpose of this stiffening material on the front wall of the main bag is to utilize the effect of the atmospheric pressure on the whole reinforced area in compressing the supplemental bag.

Reverting to the action of the oxygen valve 12, it will be observed that this opens in the direction of the pressure of the oxygen instead of against said pressure. In an emergency the oxygen valve may open and allow oxygen to enter the main breathing bag without placing the auxiliary bag under compression by the deflation of the main bag, this action being due to the difference in pressure between the contents of the main bag and the oxygen supply, resulting from the inhalation reducing the pressure in the main bag and permitting the higher pressure oxygen to open the valve 12 and flow into the main bag.

The screw collar 13' may be so adjusted that the slightest reduction of pressure in the main bag will cause the valve 12 to open, the main bag remaining in substantially distended condition and not exerting any pressure on the auxiliary bag.

At the beginning of the operation the main bag may be filled with oxygen to a pressure slightly in excess of atmospheric. This pressure added to the tension of the spring 13 holds the valve 12 closed. Upon breathing out of the main bag and reducing the pressure therein the valve 12 opens under the pressure of oxygen and allows the oxygen to flow into the main bag. By the arrangement described the circulatory system may be always kept under a positive pressure slightly above that of the atmosphere, a feature essential to the safety of the user of the apparatus, for in case of a leak in the apparatus the leakage will be outward, instead of the reverse, leakage from outside to inside if allowed permitting the irrespirable atmosphere to enter the system and the lungs of the user with disastrous results. While we prefer to utilize the collapsing of the main bag as a means for exerting pressure on the auxiliary bag it will be understood from the above that such action may be eliminated, in which event the main bag need not be stiffened. In this instance, *i. e.* where no mechanical pressure is brought to bear on the auxiliary bag by the walls of the main bag the auxiliary bag will give up its oxygen owing to the reduction of pressure in the main bag, due to the inhalation of the user.

One advantage therefore of the auxiliary bag is that the user will never be subject to distress because of his inability or difficulty in securing a full inhalation or supply of oxygen necessary to fill his lungs, because there is present in the system a freely flexible or yielding medium or container for the oxygen, or a container having a yielding or flexible portion. This is in contradistinction to an arrangement in which the user draws through the main bag from an oxygen container having rigid or unyielding walls.

It will be seen from the above that the apparatus may be set to operate under different conditions of pressure.

In any case however, the user draws his supply through the main bag from a container having a yielding wall and through a valve opening in the direction of pressure. This yielding container may be a deflatable member like the auxiliary bag within the main bag or it may assume other forms as will be hereinafter pointed out.

In order to fill the main breathing bag 9 initially or during the period of its use, we provide means for operating the valve 12 manually, this consisting of a finger lever 26 pivotally mounted and connected by a rod 27 and yoke 27' with the stem of the valve 12, the latter passing through the yoke loosely to have independent movement the stem having a head 27" engaged by the yoke. When the finger lever is pressed, the valve is lifted and thereby permits oxygen to pass into the main bag. The finger lever is under tension of a spring 28 and this finger lever, together with its spring, is inclosed in a sealed chamber 29 formed by the metal or other framework to which the main bag is attached. It will be understood, however, that under working conditions according to one setting of the apparatus, by the breathing operations of the user, the valve 12 at the top of the supplemental bag will be opened by the rise of pressure of the oxygen, due to the compression of the supplemental bag by the walls of the main breathing bag. The main breathing bag consists of a pouch or bellows like member made of rubber, leather, rubberized cloth or silk, which will hold oxygen or air under low pressure. The material stated is held by a frame-work of metal or a combination of metal, leather, or other suitable material, which may act as a stiffener and which will conform to the movements for the front part of the bag and when the bag is deflated will cause pressure to be brought against the walls of the supplemental bag contained in the main bag.

It will be observed that the air exhaled in passing through the manifold is cooled by the walls of the passages 17ª and 17ᵇ on its way to the absorber and the air is further cooled on its way from the absorber to the main bag because of its contact with the baffle plates and walls of the manifold.

Oxygen pressure regulator or pressure reducing mechanism.

The pressure reducing valve mechanism indicated diagrammatically at 3 in Fig. 1 and in detail in Fig. 5, consists of a chamber 30, Fig. 5, having an inlet nozzle at 31 screwed into an extension 32 of the chamber, this extension contains a chamber 33 with a fine wire screen or felt pad 34 interposed between it and the nozzle. The chamber 33 is filled with metal, sponge or other suitable material to intercept foreign matter on its passage from the oxygen bottle. Further, this chamber 33 serves as an expansion space or heat absorber for the oxygen. The oxygen is led to the chamber 33 through the pipe or connection 34' and from this connection the pressure gage conduit 35' leads off. The nipple or inlet nozzle 31 is closed against the passage of oxygen by a valve member 36 guided in a bracket 37 within the chamber 30, the said valve member being connected by a link 38 with a bell crank lever 39 pivoted within the casing, the other end of the bell crank lever being pivotally connected at 40 to a plate 41 forming the head of a metallic bellows 42 arranged within the casing and exposed to atmospheric pressure through the openings 43 in the casing. The bellows 42 is under pressure of a spring 44 which is adjustable as to tension by a screw 45. The outlet from the pressure reducing chamber is through a nipple 46 which delivers the oxygen to the pipe 47, which connects with the constant volume cylinder 7. The head 41 of the bellows will move according to the changes in pressure within the chamber 30, being forced up or outwardly when the pressure rises and this action being against the pressure of the spring 44, and when so moved the bell crank lever will be operated to move the valve 36 to or against the nipple 31 and thus reduce or cut off the oxygen supply until such time as the pressure within the chamber 30 has been reduced below the prescribed limit, whereupon the spring 44, together with the natural tendency of the bellows and atmospheric pressure will move the head 41 of the bellows inwardly and thus through the bell crank lever the valve 36 will be withdrawn from the nipple to allow the inflow of an additional volume of oxygen. The screw 45 is adjusted to secure the desired pressure of oxygen within the chamber 30 and this pressure is much reduced in respect to that existing in the bottle.

It will be observed that the passages through the nipples 31 and 46 are minute in respect to the size of the passages through the pipes communicating with the pressure reducing chamber and leading therefrom.

A by-pass valve 48, adjustable by hand, controls a by-pass conduit between the pipe section 34' and the pipe 47, this by-pass conduit being shown at 49. This permits the passage of oxygen directly from the oxygen bottle to the pipe 47 without passing through the pressure reducing valve mechanism or this by-pass pipe 49 may be connected with the main breathing bag or to any part of the circulation system. The purpose of this by-pass is to inflate with oxygen the breathing bag or supply the circulating system with oxygen independently of any action on the part of the pressure reducing mechanism just described.

Referring to the constant volume or constant pressure cylinder this, as stated above, has within it automatic oxygen regulator mechanism to control or regulate the supply of oxygen to the breathing apparatus according to the needs of the person using the same, one object of this mechanism being to maintain substantially a constant supply of low pressure oxygen in this cylinder or chamber to which the oxygen is supplied from the pressure reducing valve mechanism. This automatic oxygen regulator comprises a valve 50, Fig. 7, controlling an inlet pipe which leads from the pressure reducing valve mechanism. This valve is connected with a lever 51 pivotally mounted at 52 and pressed by a spring 53, the tension of which is adjustable by a screw 54. The lever under the tension of the spring presses the valve 50 to its seat against the pressure of the oxygen delivered from the pressure reducing valve mechanism. The lever 51 has a dependent arm provided with a fork 55, between the arms of which a projection 56 lies, this projection being carried by an arm or lever 57 pivoted at 58, the upper end of the lever being connected by a rod 59 with a bellows 60 which is exposed on the side opposite that upon which the link or arm 59 lies, to atmospheric pressure. A spring 61 exerts its force on the arm or lever 57 tending to move the projection 56 downwardly to engage the lower fork arm to open the valve. The pipe 8 leads off from the chamber in which this mechanism is located to the auxiliary breathing bag 11 within the main bag. When a supply of oxygen is drawn from the chamber containing the automatic oxygen regulator the bellows 60 will expand, the spring 61 assisting in this action, if such spring is used, but in any case the atmospheric pressure will act to expand the bellows and this will cause the projection 56 to engage the lower arm of the fork 55 and open the valve 50 against the pressure of the spring 53. As the chamber containing this mechanism fills with the predetermined volume of oxygen, the pressure of this oxygen will collapse the bellows 60 and the projection 56 will then come against the upper arm of the fork 55 and the lever 51 will be operated to seat the valve 50 and cut off further inlet of oxygen into the chamber. It will be noticed that the projection 56 must perform a certain amount of lost motion in moving from its low position to a position where it strikes the upper arm of the fork and gets into a position for holding the valve closed. The closing of the valve upon the accumulation of oxygen in the cylinder is affected by the spring 53. The spring 61 may be omitted if desired. The closing of the valve by the action of the projection 56, due to the collapse of the bellows, furnishes a further safeguard to the effective cutting off or further inlet of oxygen when the desired volume has accumulated in the chamber. This automatic oxygen regulator will control the supply of oxygen to the needs of the wearer and insure a positive pressure in the breathing circuit and this may be above atmospheric pressure.

*Absorber.*

The absorber consists of a container for chemicals, such as caustic soda, caustic potash, or a mixture of these for the absorption of $CO_2$. For supporting the chemicals we supply a series of corrugated screens 62 made of fine wire. The corrugations or channels in these screen members are parallel to the longer axis of the container and they are rectangular in cross section. The screens are so placed that the open spaces $a$ of one screen are directly above the spaces $b$ of the next screen below it and from this arrangement it will be noticed that all the screens, excepting the topmost and the bottom one and the chemical container channels adjacent to the sides of the absorber container, have their chemical container spaces $b$ flanked by open spaces of its own screen and above and below these chemical container spaces are the open spaces of the screens next above and next below it, so that considering any one of these chemical container channels it is surrounded by air spaces enabling the air to reach the chemical material upon its top, bottom and lateral sides.

Between the corrugated or channeled screens fine wire partitions 63 are placed to hold the chemical material in the container spaces b. At each end of the absorber a compartment 64 is arranged for the passage of air into the various spaces in the screens. To insure movement of the air through the series of screens at different levels, or through groups of screens, the absorber is divided by partitions 65 extending parallel with the screens, these partitions being of solid metal or imperforate paper or the like.

In Figs. 11 and 12 is shown an organization differing in some particulars from that first described. Where the parts are the same as those previously described like reference characters are used, for instance, the oxygen bottle, pressure reducing valve, absorber, the mouth piece, inhalation and exhalation tubes, the manifold and cooler, if such is employed and the connections between the main bag and the other parts may be the same as those above referred to. The constant volume or constant pressure container for the oxygen is different from that previously described, the present form consisting of a bag of rubber or like deflatable or yielding material 60$^a$ inclosed within a casing or holder 7$^a$ of open work or perforated to permit atmospheric pressure to reach the container. This container is connected through a valve 12$^a$ with the interior of the main bag 9$^a$. This valve opens in the direction of the pressure of the oxygen. It is pressed by a spring 13$^a$ toward its seat and it is controlled by a lever 66 pivoted at 67. This lever is adapted to be operated to open the valve by a lever 68, also pivoted at 67 and arranged to bear on the lever 66 after a certain degree of lost motion of said lever has taken place, or after the main breathing bag has deflated to a certain degree. The lever 68 is operated by a link 69 connected with the wall of the main bag.

The valve lever 66 is also under the control of an expansible member 11$^a$ to the interior of which the oxygen has free access through the connection 11$^x$ from the oxygen conveying tube or pipe 8. The air inlet to this bag is at 21 and the air outlet or inhalation connection is at 14. This bag is of sufficient capacity to furnish air for two ordinary inhalations. Upon an ordinary inhalation the bag is deflated far enough to exhaust only about one-half of its contents. Upon a deep inhalation the bag will be more than half deflated and thereupon the lever 68 comes in contact with the lever 66 and depresses it. This will relax the tension of the spring 13$^a$ upon the valve, whereupon the valve will open and oxygen will enter the bag and mingling with the air will make a respirable mixture.

Upon inflation of the bag due to exhalation and the resulting inflow of air to the bag at 21 the lever 68 will raise from engagement with the valve lever 66 and the pressure of oxygen within the bellows or expansible member 11$^a$ will elongate this bellows and press the lever 66 to restore the tension of the spring 13$^a$ and thus close the valve 12$^a$.

In this form of apparatus while the auxiliary bag of the form shown in Fig. 1 is not employed, some of the functions of said auxiliary bag are performed by parts of this modified apparatus. Thus the bag 60$^a$ serves not only as the container for the oxygen but it performs one function of the secondary breathing bag, in that when the main breathing bag becomes deflated by reason of the inhalations by the user the bag 60$^a$ becomes available as a yielding or flexible secondary container upon which the user may draw.

In Fig. 13 we show a detail view of a relief valve located at the bottom of the manifold or bag as at 71, Fig. 1. This valve may be operated manually by the user at such time as he may wish to release the air within the bag in order to get rid of any accumulation of nitrogen or other gases within the breathing circuit. The valve comprises a disk 11$^a$ closing under spring pressure outwardly against its seat to retain the air in the bag. The operator by pressing upon the button 72 can open the valve to allow the gases to escape from the bag. Means are provided to prevent the external air from entering the bag while the release valve is open and this consists of a very light disk 73, which will close against its seat inwardly, the valve being pressed by a light spring 74 toward its seat. This light valve and its light spring will not prevent the escape of gases from the interior of the bag but should the air from the outside attempt to pass into the bag the light valve disk will seat itself. The final escape opening for the internal gases is indicated at 75.

It will be understood from the foregoing description that the apparatus is susceptible of adjustment to work under a pressure which in no part of the system falls below atmospheric, whereas under a different adjustment the apparatus will work with a pressure which at times is equal to the atmospheric pressure at the place where it is being used, thus accommodating itself to conditions with relation to elevations above or below sea level.

What we claim is:

1. In combination, a main breathing bag, a primary container for oxygen, a secondary container for oxygen connected with the main container and having a yielding wall, a valved connection between said secondary container and the main bag, automatically controlled pressure reducing means between the primary and secondary oxygen containers, inlet and outlet connections for the main bag, an absorber, connected with the inlet of the main bag and a mouth piece connected with the outlet of the main bag and with the absorber, substantially as described.

2. In combination, a main breathing bag, a secondary container for oxygen having a yielding wall, a valved connection between said secondary container and the main bag, inlet and outlet connections for the main bag, an absorber, connected with the inlet of the main bag, and a mouthpiece connected with the outlet of the main bag and with the absorber, said valve opening under the oxygen pressure to permit oxygen to flow into the main bag, substantially as described.

3. In combination a main breathing bag, a primary oxygen container, a secondary bag of deflatable form and containing oxygen, automatically controlled pressure reducing means between the primary container and the secondary bag, a connection between the secondary bag and the main bag including a valve opening in the direction of pressure of the gas coming from the reducing means, and under said pressure, whereby the user can draw through the main breathing bag from the deflatable secondary bag, an absorber connecting with the main bag and a mouth-piece communicating with the main bag and with the absorber, substantially as described.

4. In combination a main breathing bag, a secondary bag within the main bag, an oxygen supply connected with the secondary bag, a valve between the secondary bag and the main bag opening toward the latter and in the direction of the oxygen pressure thereon, an absorber communicating with the main bag and a mouth piece communicating with the main bag and the absorber, substantially as described.

5. In combination an oxygen bottle, a breathing bag, an absorber communicating therewith, a mouth piece communicating with the absorber and the main bag, an automatic pressure reducing valve and an automatic oxygen constant volume regulator communicating with the main bag, and with the oxygen bottle, whereby volumes of oxygen under a substantially uniform pressure are delivered to the main bag according to the needs of the user, substantially as described.

6. In combination a main breathing bag, an absorber communicating therewith, a mouth piece communicating with the main bag and the absorber, an oxygen container, a valve controlling the inlet of oxygen from the container to the main bag, and a member controlling said valve and expansible under the oxygen pressure, and an automatic pressure reducing means supplying the oxygen from the container to said inlet valve and to the interior of said expansible member, substantially as described.

7. In combination a main breathing bag, an absorber communicating therewith, a mouth piece communicating with the main bag and the absorber, an oxygen container, a valve controlling the inlet of oxygen from the container to the main bag, and a member controlling said valve and expansible under the oxygen pressure from said container, said member deflating when the main bag is deflated and an automatic pressure reducing means supplying the oxygen from the container to said inlet valve, substantially as described.

8. In combination a breathing bag, an absorber connected thereto, a mouth piece connected with the bag and with the absorber, an oxygen bottle, an automatic pressure reducing valve, and an automatic oxygen constant volume supply regulator between said pressure reducing valve and the bag comprising a valve and means controlling said valve and subjected to the oxygen pressure, substantially as described.

9. In combination in a breathing apparatus, a main breathing bag, an auxiliary bag within the same, an oxygen supply connected with the auxiliary bag, a valve controlling the discharge of oxygen from the auxiliary bag into the main bag, said auxiliary bag being subject to pressure from the deflated main bag to thereby cause the opening of the valve, an absorber, connected with the main bag for the delivery of air thereto, a mouth piece connected to the main bag for drawing air and oxygen therefrom, and a connection between the mouth piece and the absorber, substantially as described.

10. In combination in a breathing apparatus, a breathing bag, an oxygen supply, a valve controlling the inlet of oxygen into the bag, a member within the bag adapted to receive oxygen and expand and by its deflation controlling the opening of said valve, a connection leading oxygen to the main bag, in which connection said valve is located, a mouth piece and a connection between the bag and said mouth piece.

11. In combination in a breathing apparatus, a breathing bag, a valve controlling the inlet of oxygen into said bag, an air inlet, a mouth piece connected with the bag for drawing off air and oxygen, a collapsible member receiving oxygen from an oxygen supply, and subjected to pressure from the bag in deflating and by its own deflation controlling the opening of the valve, and the inlet of oxygen into the bag, substantially as described.

12. In combination in a breathing apparatus, a main breathing bag, an auxiliary bag within the same, an oxygen supply connected to the auxiliary bag, a valve controlling the discharge of oxygen from the auxiliary bag into the main bag, a spring tending to hold the valve to its seat but yielding to allow the valve to open when the pressure in the auxiliary bag rises due to pressure on its walls from the deflating main bag, an air inlet to the main bag, a mouth piece and a connection between the mouth piece and the main bag, substantially as described.

13. In combination a breathing bag, means for supplying oxygen thereto, an absorber, connected to the bag, a mouth piece connected to the bag and absorber and a manifold in the circulating system of the mouth piece, absorber and bag, for cooling the air delivered to the bag, said manifold having a passage connecting with the absorber and the bag, and a second passage connecting with the mouthpiece and the absorber, both of said passages being circuitous, substantially as described.

14. In combination a breathing bag, means for supplying oxygen thereto, an absorber, connected to the bag, a mouth piece connected to the bag and absorber and a manifold in the circulating system of the mouth piece absorber and bag for cooling the air delivered to the bag, said manifold having a passage receiving the exhalations and directing them to the absorber and another passage delivering the same from the absorber to the bag, substantially as described.

15. In combination a breathing bag, an inhalation and an exhalation conduit, means for supplying oxygen to said bag, an absorber, a manifold attached to the bag, on one face thereof, and connections between said manifold and the bag, absorber, and exhalation conduit for cooling the air, said manifold having a passage for exhalations, and another passage for the air delivered from the absorber to the bag.

16. In combination in a breathing apparatus, a breathing bag and a manifold for cooling the air arranged in one group to rest on the chest of the user, and an oxygen bottle, and pressure reducing valve and absorber, in another group resting on the back of the user with conduits connecting the parts to provide the circulating system, substantially as described.

17. In combination a breathing bag, an oxygen bottle connected therewith, an absorber, conduits forming a circulating system and comprising in part a manifold having circuitous passages therein for the air and a cooler adjacent said manifold, substantially as described.

18. In combination a breathing bag, an oxygen bottle connected therewith, an absorber, conduits forming a circulating system and comprising in part a manifold having circuitous passages therein for the air and a cooler adjacent said manifold, and located between said manifold and breathing bag, substantially as described.

19. In combination a breathing bag, an oxygen bottle connected therewith, an absorber, conduits forming a circulating system including the absorber and the breathing bag, an automatic pressure reducing valve in connection with the oxygen bottle and means between said reducing valve and the breathing bag to maintain a substantially constant volume of oxygen therein at low pressure for supplying the breathing bag, substantially as described.

20. In combination with a breathing bag, an oxygen bottle, a chamber between said bottle and the breathing bag for maintaining a substantially constant volume of oxygen, a pressure reducing valve for controlling the supply to said chamber, a valve in said chamber, a lever connected with the valve under spring tension, a bellows subjected to the pressure of oxygen in the said chamber and a lost motion connection between the bellows and the lever for operating the same to hold the valve closed, substantially as described.

21. In combination with a breathing bag, an absorber consisting of a chamber having screens superposed one upon another therein and having channels extending substantially parallel with each other, some of said channels having chemical material therein for absorbing carbon dioxid and moisture, said channels alternating with empty channels which provide air spaces for the access of air to the chemical material, and the empty channels of one screen alternately in position with the empty spaces of the screens above and below it, said channels being of like cross sectional shape and area, whereby each filled channel is exposed on all sides and throughout the extent of each of its surfaces to the air in the empty channels, substantially as described.

22. In combination with a breathing bag, an absorber having screens formed with parallel channels and with the adjacent channels open in opposite directions, the superposed screens being reversed in position and alternate channels of each screen containing chemical material for absorbing carbon dioxid and moisture and being opposite the empty channels of the screens above and below, whereby each channel containing chemical has lying adjacent at top and bottom and at its sides air channels by which the air may have ready access to the chemical material, substantially as described.

23. In combination with a breathing bag, an absorber consisting of a casing having end compartments, series of superposed screens, in the casing, each screen having parallel channels alternately opening upwardly and downwardly and with the adjacent screens having channels reversely arranged, that is with a channel opening downwardly opposite the upwardly open channel of the adjacent screen and partitions in between the channeled screens, the upwardly open channels being filled with chemical material, said partitions dividing the casing into spaces communicating with said end compartments to form a circuitous air passage, substantially as described.

24. In combination a breathing bag, an absorber consisting of a chamber, a series of superposed screens therein having parallel channels, the channels of each screen being alternately empty and filled with chemical material, and with the filled channels of one screen opposite the open channels of the next screen, and imperforate partitions extending parallel with the open and filled spaces and forming a circuitous channel for the air to compel it to pass along the open channels longitudinally thereof in one direction in one set and in the opposite direction in another set, the air being brought into contact with the material in the filled channels throughout the length thereof.

25. In combination with a breathing bag, an absorber consisting of a casing, a series of superimposed screens therein, each screen having parallel channels alternately opening upwardly and downwardly and the upwardly open channels being filled with absorbent material and the downwardly open channels being empty and substantially straight screens independent of the channeled screens interposed between the channeled screens and extending across the open sides of said channels, said casing having a compartment at each end of the open channels for the passage of the air, substantially as described.

26. In combination a breathing bag, an oxygen bottle, an absorber and connections including said parts and forming a breathing circuit, and a valve controlled outlet for the internal gases from the system and automatic safety means to prevent the ingress of noxious gases from the atmosphere through said outlet while said outlet is open, substantially as described.

27. In combination a breathing bag, an oxygen bottle, an absorber and connections including said parts and forming a breathing circuit, and an outlet for the internal gases from the system with a hand operated valve controlling said outlet and an automatic safety valve closing toward the interior of the bag over said outlet to guard against the ingress of noxious gases from the outside atmosphere to the interior of the bag while the hand operated valve is open.

28. In combination a breathing bag and a release valve connected with said bag and adapted to be operated manually to permit the internal gases to escape to the atmosphere and means for preventing the entrance of atmospheric air through the valve into the bag while said release valve is open, said means consisting of a light valve disk under light spring pressure closing inwardly over the opening of the main valve, substantially as described.

JAMES W. PAUL.
CLARENCE HALL.